US006189853B1

(12) United States Patent
Kuhn

(10) Patent No.: US 6,189,853 B1
(45) Date of Patent: Feb. 20, 2001

(54) TRANSMISSION STAND

(76) Inventor: Alan T. Kuhn, 1018 State Rd., New London, PA (US) 19360

( * ) Notice: Under 35 U.S.C. 154(b), the term of this patent shall be extended for 0 days.

(21) Appl. No.: 09/399,256

(22) Filed: Sep. 20, 1999

(51) Int. Cl.[7] .......... F16M 1/00; F16M 11/00; F16M 3/00; F16M 5/00; F16M 7/00

(52) U.S. Cl. .......... 248/676; 248/150; 248/121; 269/47; 269/901; 269/909

(58) Field of Search .......... 248/676, 150, 248/121, 126; 269/131, 47, 901, 909

(56) References Cited

U.S. PATENT DOCUMENTS

| | | | | |
|---|---|---|---|---|
| 2,919,092 | * | 12/1959 | Chasar et al. | 248/164 |
| 3,461,832 | | 8/1969 | Vierling | 115/41 |
| 4,880,194 | | 11/1989 | Geise et al. | 249/177 |
| 5,087,013 | * | 2/1992 | Gress et al. | 248/676 |
| 5,160,125 | * | 11/1992 | Jenkins | 269/50 |
| 5,259,602 | * | 11/1993 | Rogos | 269/17 |
| 5,275,365 | | 1/1994 | Gerbel et al. | 248/129 |
| 5,562,271 | * | 10/1996 | Davis, Jr. | 248/675 |
| 5,662,307 | * | 9/1997 | Lentine | 248/640 |
| 5,848,778 | * | 12/1998 | Wagner | 248/676 |

* cited by examiner

*Primary Examiner*—Leslie A. Braun
*Assistant Examiner*—A. Joseph Wujciak
(74) *Attorney, Agent, or Firm*—Connolly Bove Lodge & Hutz LLP

(57) ABSTRACT

A transmission stand comprises a front leg assembly and a rear leg assembly pivotally mounted thereto to collectively produce a stable A-frame construction. The rear leg assembly includes a pair of spaced apart rear legs and a stabilizer bar connected between the lower end portions and the rear legs. The front leg assembly includes a pair of spaced apart front legs and an inverted U-shaped lower support connected to the lower end portions of the front legs. The inverted U-shaped lower support extends between and outwardly from the front legs to effectively stabilize the transmission stand. A retainer bracket and chain assembly adjustably connects between the front legs for supporting and securing the lower transmission portion to the front leg assembly. Upper transverse mounting arms are secured to a horizontal support rod extending between the upper ends of the front legs, and a plurality of spaced apart openings on each mounting arm facilitate releasable securement of the arms to the upper portion of the transmission by fasteners extending through the openings into threaded openings in the transmission.

5 Claims, 2 Drawing Sheets

TRANSMISSION STAND

BACKGROUND OF THE INVENTION

The present invention relates to a transmission stand, and more particularly to a stand that properly supports and positions a transmission for repair work.

Automobile transmissions frequently need repair. The transmission itself is bulky, heavy, and has many internal parts that need to be arranged in a specific fashion. The current state of the art is to remove the transmission and place it on a work bench or on the floor. The repair, which can take a considerable amount of time, is done with the technician on his knees or bending over, which becomes uncomfortable and requires frequent breaks thereby lengthening the time for the repair. Furthermore, the fluid drainage of the transmission is very difficult to complete because of the shape of the transmission with no well defined low point. The fluid also will run onto the floor creating a further environmental and clean up problem.

Vierling U.S. Pat. No. 3,461,832 describes a method of lifting an outboard motor up and out of the water while the motor remains mounted on the boat. This device consists of a cable attached to the motor which is further attached to a lever arm mounted on the side of the boat. Although effective for raising the motor, it is completely ineffective for lifting a transmission into an upright position. The free transmission would simply spin and fall on the floor.

Geise U.S. Pat. No. 4,880,194 describes an easel-type device for working on parts. The mounting of a transmission on this type of device would require a crane. Furthermore, maintaining the transmission on the easel would be difficult since the easel would be very top heavy. With the significant weight of a transmission attached, it would easily topple and would be an unacceptable work surface.

Gerber U.S. Pat. No. 5,275,365 describes a device which takes a vertical object and brings it to a horizontal position. This does not help in the use of transmission servicing since the optimum final position is not quite vertical. There is no method for lifting the transmission which is horizontal on the floor to the vertical position.

SUMMARY OF THE INVENTION

Accordingly, a primary object of the present invention is a transmission stand that greatly facilitates the ability to work on an automobile transmission by placing it in an upright and stable position.

Another object of the present invention is a transmission stand that easily allows fluid drainage of the transmission without clean up and environmental problems.

Still another object of the present invention is a transmission stand that safely and efficiently supports and positions a heavy and awkwardly shaped automobile transmission for repair work.

In the present invention, the base of the stand is wider than the main body of the stand to give it stability. There is also the added benefit of allowing the placement of a catch basin directly underneath the low point of the transmission to collect the draining fluid. The angle at which the transmission is held on the stand is less than vertical so that nothing falls out when the pan and the valve body of the transmission are removed. The generally triangular shape of the transmission requires that the large base of the transmission be mounted at a high position for service. In the transmission stand of the present invention, arm attachments are provided near the top located a distance from the handle of the stand. The arms are then attached to the pre-existing bolt holes in the transmission with bolts while the transmission is on the ground. The arms may be adjusted inwardly and outwardly for various size transmissions. Another chain is slid underneath the transmission while it is on the floor and then reattached to the stand to prevent sway in the lifting process. When the stand is then lifted by the handle providing leverage, the premounted transmission is then easily brought in the not quite vertical position most appropriate for its servicing.

Still another purpose is a method of raising the transmission by attaching a device to bring it from horizontal to a vertical position. This provides great benefits to the mechanic where a crane may be used to lift the stand with the attached transmission.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar references refer to similar parts and in which.

DETAILED DESCRIPTION OF THE INVENTION

Figure 3:
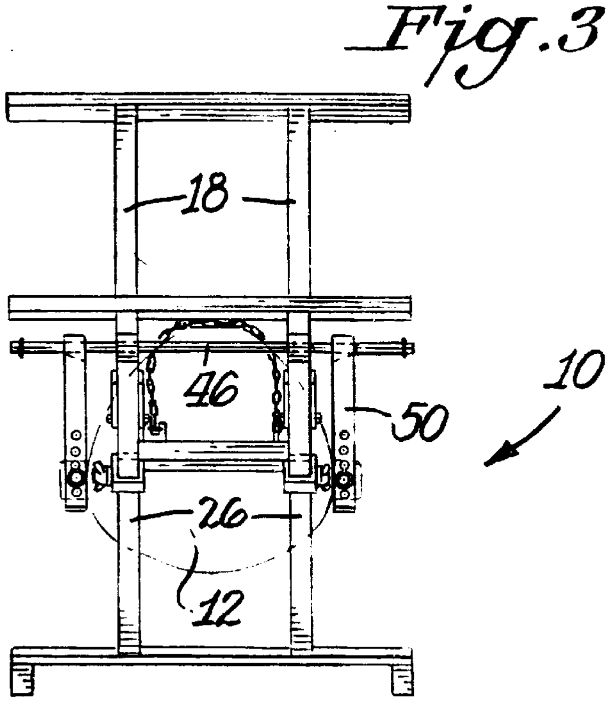
FIG. 3 is a top plan view of the transmission stand shown in FIGS. 1 and 2.
Figure 1:
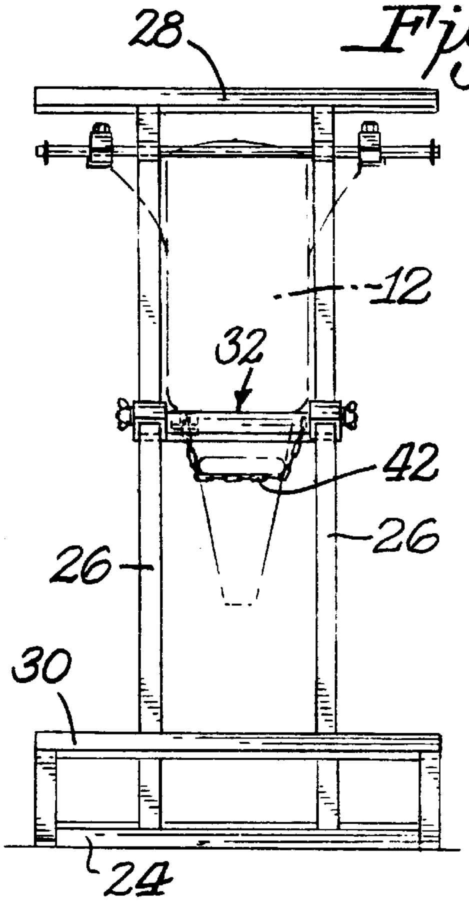
FIG. 1 is a front elevational view of a transmission stand, according to the present invention.
Figure 2:
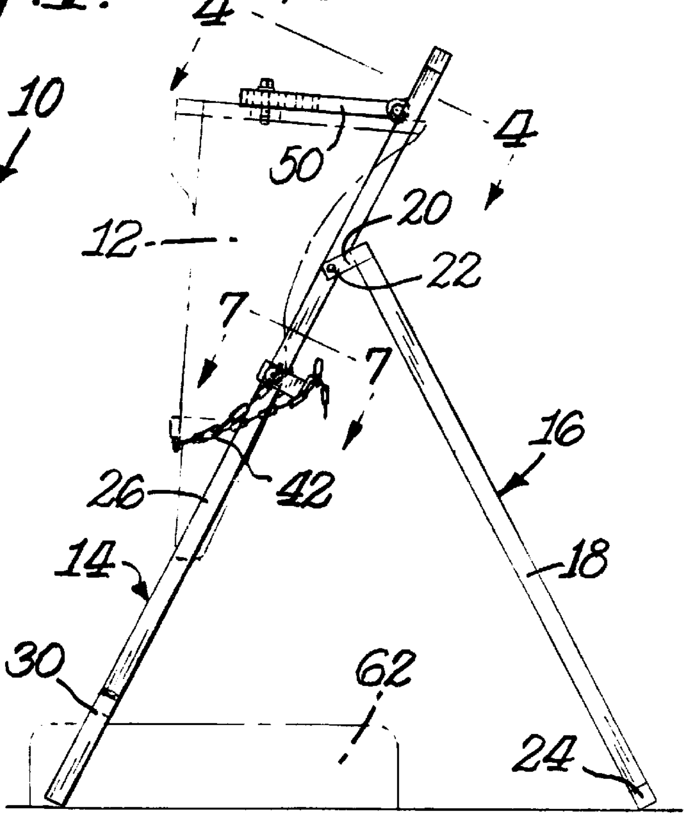
FIG. 2 is a side elevational view of the transmission stand shown in FIG. 1.

Referring in more particularity to the drawings, FIGS. 1–3 illustrate a transmission stand 10, according to the present invention, for supporting an automobile transmission 12 in a generally up-right but slightly angled position to facilitate repair work on the transmission. The transmission stand comprises a front leg assembly 14 and a rear leg assembly 16 pivotally mounted to the front leg assembly to collectively produce an A-frame construction. The rear leg assembly 16 includes a pair of spaced apart legs 18, each of which is pivotally mounted to the front leg assembly by a bracket 20 and pivot pin 22. Bracket 20 is U-shaped and functions to limit the relative angle between the front and rear leg assemblies, as shown best in FIG. 2. In the non use position of transmission stand 10 the rear leg assembly 16 simply fits against the front leg assembly for ease of storage. A stabilizer bar 24 is connected between the lower ends of rear legs 18, and the end portions of the stabilizer bar extend outwardly beyond each of the rear legs.

Front leg assembly 14 includes a pair of spaced apart legs 26 with a handle 28 connected to the upper ends of the front legs. An inverted U-shaped lower support 30 is connected to the lower ends of the front legs, and support 30 includes outer portions that extend beyond front legs 26 to stabilize transmission stand 10 in its opened in use position.

Figure 7:
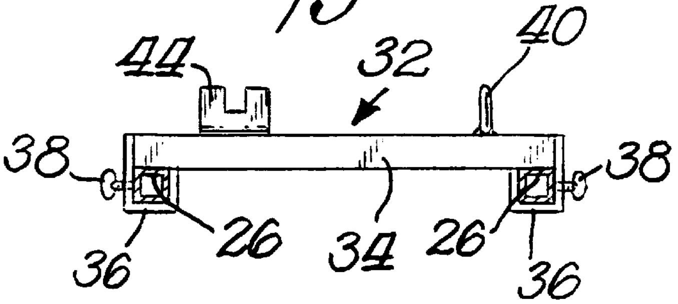
FIG. 7 is a sectional view taken along line 7—7 of FIG. 2.
Figure 8:
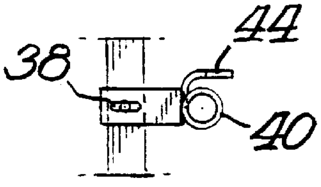
FIG. 8 is a side elevational view of the lower retainer bracket and chain assembly shown in FIG. 7.

A retainer bracket and chain assembly 32 is adjustably connected between front legs 26 of the front leg assembly, as shown best in FIGS. 1 and 7. Assembly 32 includes a bracket 34 with leg engaging sleeves 36 at the opposite ends thereof. The front legs 26 are received within the sleeves 36 and thumb screws 38 function to adjustably secure the retainer bracket and chain assembly 32 to the front leg assembly. An eye bolt 40 is fixed at one end of bracket 34, and a securing chain 42 is connected at one end thereof to eye bolt 40. A chain hook 44 is fixed to bracket 34 at the other end thereof for releasably securing the free end of chain 42 to the bracket. In use, the lower end of transmission 12 is releasably secured to the retainer bracket and chain assembly 32 by simply wrapping chain 42 about the transmission and releasably engaging the free end of the chain with chain hook 44.

Figure 4:
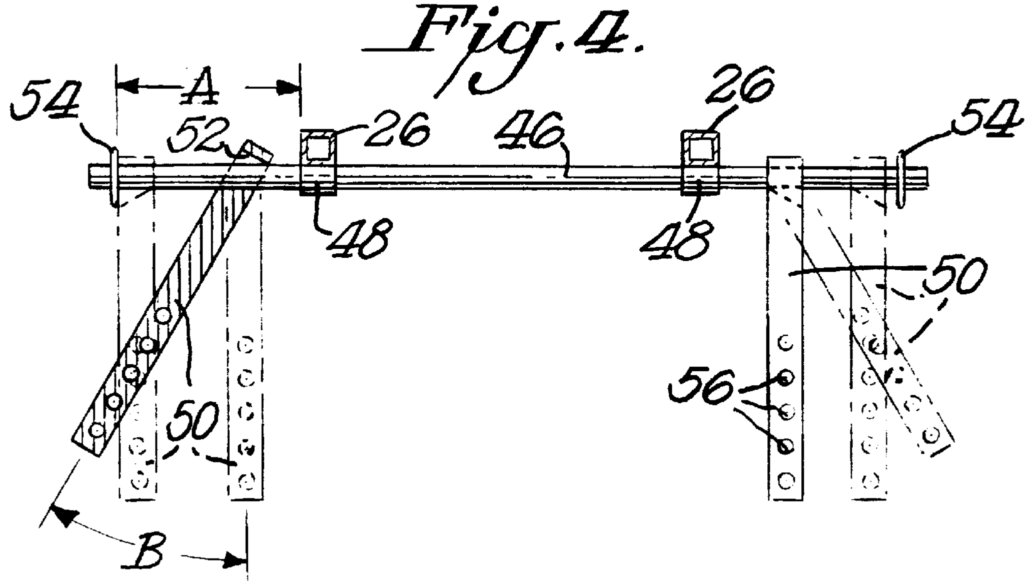
FIG. 4 is sectional view taken along line 4—4 of FIG. 2.
Figure 5:
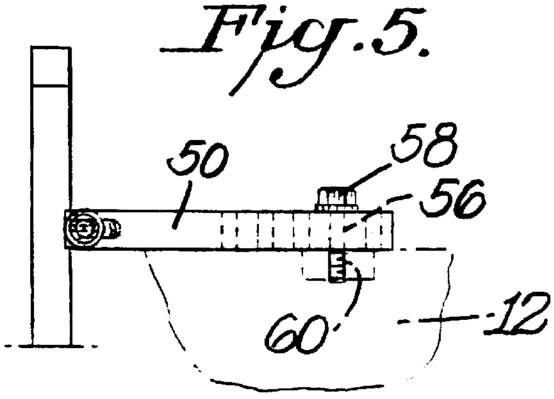
FIG. 5 is a fragmental left side elevational view of the transmission stand as shown in FIG. 4.
Figure 6:
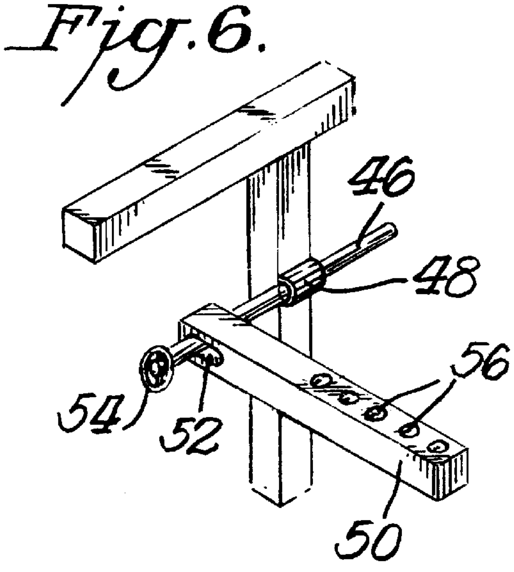
FIG. 6 is a perspective fragmental left side view of the mounting arm of the transmission stand, according to the present invention.

A horizontal rod 46 extends between and outwardly from the upper ends of front legs 26 of the front end assembly 14, as shown best in FIG. 4. Bearings 48 are secured to front legs 26 and the horizontal rod 46 is secured in the bearings 48. The ends of horizontal rod 46 extend beyond front legs 26 by a distance A.

A pair of upper transverse mounting arms 50 are secured to longitudinal rod 46 between the ends of the rod and each of the front legs 26. A beveled opening 52 at the inner end of each mounting arm 50 enables the arms to receive the ends of horizontal rod 46. Retainer rings 54 at the ends of the horizontal rod hold mounting arms 50 in place between the front legs 26 and the free ends of the horizontal rod.

The arrangement between transverse mounting arms 50 and horizontal support rod 46 is such that the mounting arms freely rotate about the horizontal axis of the horizontal rod. Additionally, each mounting arm 50 is capable of movement along the distance A of the horizontal rod. Another equally important movement of mounting arms 50 is the angular movement B which enables each arm to swing outwardly, as shown best in FIG. 4.

Each of the transverse mounting arms 50 includes a plurality of spaced apart openings 56 for securing the mounting arms to the upper end of transmission 12. Bolts 58 extend through one or more of the openings 56 into threaded openings 60 in the upper end of the transmission. Once the transmission is secured in place to the retainer bracket and chain assembly 32, the transmission rests against the front legs 26 of front end assembly 14. Bracket 34 is initially positioned on the front legs 26 at a height which then positions to the upper end of the transmission in close proximity to the upper end of the stand. Mounting arms 50 are then manipulated to position at least one of the mounting holes 56 in alignment with a threaded opening 60 in the transmission, and mounting bolts 58 are then used to secure the mounting arms 50 to the transmission.

A drain pain 62 is conveniently positioned directly below transmission 12 to receive transmission fluids. Inverted U-shaped lower support 30 enables the drainage pan to be properly positioned to receive these fluids. With the transmission 12 secured to stand 10 repair work may be conducted with a minimum of difficulty and in an extremely safe position.

The automobile transmission may be mounted to the transmission stand when the stand is collapsed and lying on the floor. After chain 42 is wrapped around the transmission and secured to chain hook 44 and the mounting arms are secured by bolts 58 to the transmission, the stand and transmission are lifted in a vertical direction by handle 28. The leg assemblies are then spread apart and the transmission is ready for repair work. After completion of the repair this process is reversed and the transmission is removed as noted above. The stand may be stored in its collapsed condition with chain 42 wrapped around the leg assemblies to hold them in place.

What is claimed is:

1. A transmission stand comprising a front leg assembly, a rear leg assembly mounted to the front leg assembly to collectively produce an A-frame construction, the rear leg assembly including a pair of spaced apart rear legs and a stabilizer bar connected between lower end portions of the rear legs, the front leg assembly including a pair of spaced apart front legs, an inverted U-shaped lower support connected to lower end portions of the front legs extending between and outwardly from the front legs, a retainer bracket and safety assembly adjustably connected between the front legs for supporting and securing a lower transmission portion to the front leg assembly, a horizontal rod extending between the front legs at upper end portions thereof, a pair of upper transverse mounting arms secured to the horizontal rod for swinging movement about a horizontal axis of rod, and a plurality of spaced apart openings on each mounting arm to facilitate releasable securement of an upper transmission portion to the arms by fasteners extending through the openings in the arms into internally threaded openings in the transmission.

2. The transmission stand as in claim 1 including a beveled opening in each mounting arm through which the horizontal rod extends for securing the mounting arms to the rod, and wherein the beveled opening in each mounting arm enables each arm to swing about a horizontal axis of the rod and also to swing angularly outwardly or inwardly of the front leg assembly.

3. The transmission stand as in claim 1 including a handle portion at the upper end of the front leg assembly.

4. The transmission stand as in claim 1 wherein the retainer bracket and safety assembly includes a chain fixed at one end thereof to the bracket, and a chain hook on the bracket for releasably connecting the other end of the chain to the chain hook after the chain is wrapped around a lower portion of the transmission.

5. The transmission stand as in claim 1 wherein the rear leg assembly is pivotally mounted to the front leg assembly.

* * * * *

UNITED STATES PATENT AND TRADEMARK OFFICE

CERTIFICATE OF CORRECTION

PATENT NO. : 6,189,853 B1
DATED : February 20, 2001
INVENTOR(S) : Alan T. Kuhn

It is certified that error appears in the above-identified patent and that said Letters Patent is hereby corrected as shown below:

Column 2,
Line 31, insert the word -- a -- after "is".

Signed and Sealed this

Second Day of October, 2001

*Attest:*

Nicholas P. Godici

NICHOLAS P. GODICI

*Attesting Officer* *Acting Director of the United States Patent and Trademark Office*